Feb. 9, 1926.  1,572,599

H. T. GRAFTON ET AL

APPARATUS FOR PURIFYING GAS

Filed March 30, 1921   2 Sheets-Sheet 1

Feb. 9, 1926.
H. T. GRAFTON ET AL
1,572,599
APPARATUS FOR PURIFYING GAS
Filed March 30, 1921   2 Sheets-Sheet 2
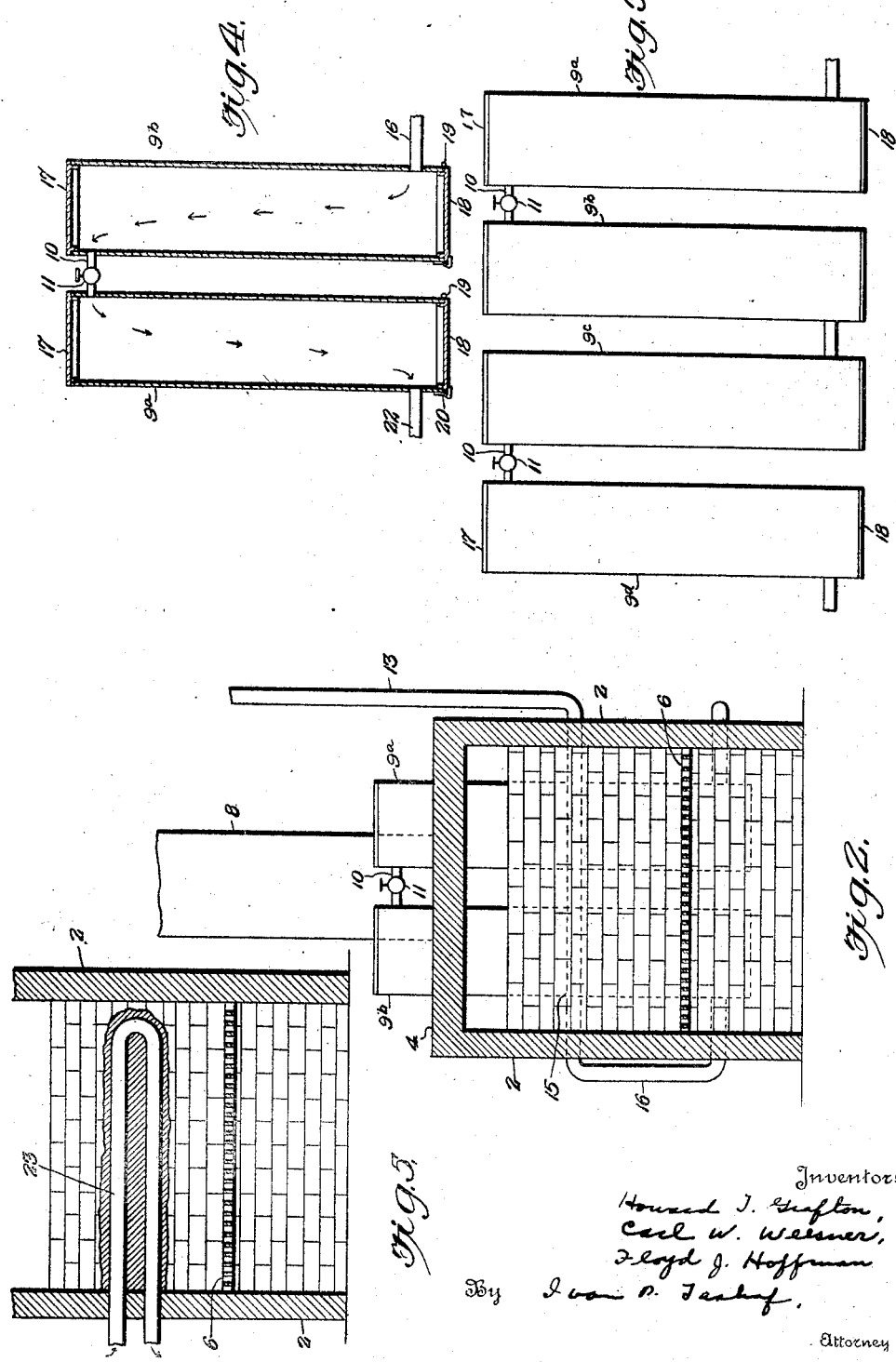

Patented Feb. 9, 1926.

1,572,599

UNITED STATES PATENT OFFICE.

HOWARD TOLAN GRAFTON, CARL WILLIAM WEESNER, AND FLOYD JACOB HOFFMAN, OF WARREN, OHIO.

APPARATUS FOR PURIFYING GAS.

Application filed March 30, 1921. Serial No. 456,913.

*To all whom it may concern:*

Be it known that HOWARD T. GRAFTON, CARL W. WEESNER, and FLOYD J. HOFFMAN, citizens of the United States, residing at Warren, in the county of Trumbull and State of Ohio, have invented certain new and useful Improvements in Apparatus for Purifying Gas, of which the following is a specification.

Our invention relates to an apparatus for purifying gas, more particularly, producer gas.

Raw producer-gas coming from a producer, utilizing preferably charcoal fuel, carries certain constituents which exert an exceedingly harmful effect on steel plates when subjected to an atmosphere of this gas during the annealing or cooling period. In order to successfully utilize producer gas for the annealing of steel plates and similar articles it is necessary to increase the reducing character of the gas by decreasing the moisture and corbon dioxid-contents and substantially eliminating the oxygen-content.

The object of our invention is the provision of an apparatus which will effectively increase the reducing character of the gas and at the same time be of simple construction, capable of operating in an efficient and economical manner. We believe the apparatus hereinafter described and set forth meets these requirements.

For a complete understanding of our invention, reference is directed to the accompanying drawings in which:

Figure 2 is an end view of the same partly in section;

Figure 3 is a side view of the purification-chambers;

Figure 4 is a sectional view of the same, and

Figure 5 is a detail of a modified preheating chamber.

Figure 1:
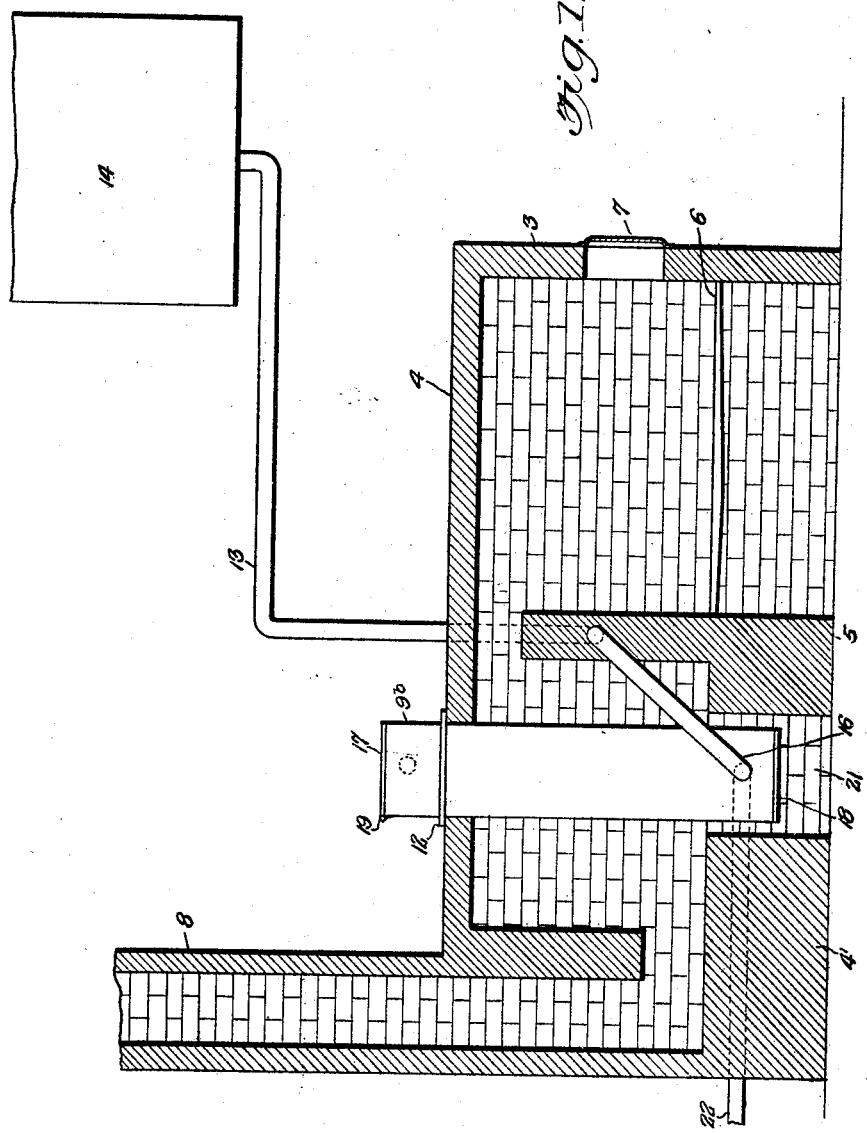
Figure 1 is a side view partly in section of the purifying-apparatus.

Referring to the drawings, the apparatus comprises a furnace 1 having the customary side and end walls 2 and 3, roof 4, and bottom 4', fire wall 5, and grate 6. The furnace is provided with a fire-door 7 and a flue 8. Suspended from the roof 4 by the flanges 12 and protruding therefrom are longitudinally extended purification-chambers $9^a$ and $9^b$ suitably connected with each other by means of conduits 10 carrying valves 11. The purification-chambers may form a single battery as shown in Figures 2 and 4, or a series as shown in Figure 3. The feed pipe 13 carries the gas to be purified from a suitably located storage-tank 14 to the preheater 15 which is enclosed in a refractory material adapted to be heated by the furnace-gases, preferably the fire wall 5. The preheater 15 is integral with the pipe 16 which is substantially outside of the furnace wall 2 and leads to the purification-chamber $9^b$. The purification-chambers $9^a$ and $9^b$ have removable top and bottom plates 17 and 18, both preferably hinged as at 19. The bottom plates are provided with plate-retaining-means 20.

The furnace is provided with a tunnel or pit 21 and the purification-chambers only partially extend into the same, thereby permitting access at all times to the chambers. The purified gas passes from the furnace by means of the conduit 22. The preheater may be in the form of a U-tube as shown in Figure 5.

The preheater and purification-chambers may be made of any suitable material but are preferably formed of wrought iron-material and carry a fireproof cement.

The construction set forth provides a simple yet efficient apparatus. The purification-chambers which are always full of a purification-medium, preferably charcoal, are as above described, longitudinally extended, and protrude from the roof of the furnace, thereby making the chambers accessible from the outside of the furnace, facilitating cleaning and refilling without disturbing the fire. This arrangement makes it possible to have most of the chamber-connections outside of the furnace. As the chambers $9^a$ and $9^b$ are suspended from the roof by means of flanges 12, they may be easily removed in case it becomes necessary to replace them.

Since the reactions that occur in the purification-chambers only take place at or above 500° C. and as all the reactions with the exception of one are endothermic, it is essential to deliver the gas to the purification-chambers as hot as possible and this is advantageously accomplished by passing the gases through the preheater 15.

In the opertion of the apparatus set forth the producer-gas containing considerable quantities of moisture, carbon dioxid and oxygen is passed from the storage-tank 14, through conduit 13 to the preheater 15 located in the fire wall 5 and then through conduit 16 into the longitudinally-extended purification-chambers 9ª and 9ᵇ, which are substantially completely filled with a porous purification-medium, preferably charcoal. Any substance which is porous and free from sulfur and acts as reducing medium may be used. Carbonaceous material, and more particularly, charcoal is preferred. Longitudinally-extended chambers provide a large purification-surface and this is highly desirable. The gas enters chamber 9ᵇ through conduit 16 and passes upwardly through the chamber filled with the purification-medium and into the chamber 9ª by means of conduit 10. The gas passes downwardly through chamber 9ª and into conduit 22. The direction which the gas takes in its passage through the chambers is indicated by the arrows in Figure 4.

We claim:

1. A furance for purifying gas having a preheater adapted to be heated by the furnace-gases, purification-chambers suspended from and entirely supported by the furnace-roof and means for delivering the gas from the preheater to the purification-chambers.

2. A furnace for purifying gas having a preheater enclosed in a refractory material adapted to be heated by the furnace-gases, purification-chambers suspended from and entirely supported by the furnace-roof and means for delivering the gas from the preheater to the purification-chambers.

3. A furnace for purifying gas having a preheater enclosed in a refractory material adapted to be heated by the furnace-gases, longitudinally-extending purification-chambers suspended from and entirely supported by the furnace-roof and means for delivering the gas from the preheater to the purification-chambers.

4. A furnace for purifying gas having a preheater enclosed in a refractory material adapted to be heated by the furnace gases, a series of purification-batteries suspended from and entirely supported by the furnace-roof and means for delivering gas from the preheater to the purification-batteries.

5. A furnace for purifying gas having a preheater enclosed in the fire-wall adapted to be heated by the furnace-gases, longitudinally-extended purification-chambers protruding and suspended from the furnace-roof and entirely supported thereby and means for delivering gas from the preheater to the purification-chambers.

6. A furnace for purifying gas having a preheater adapted to be heated by the furnace-gases, flanged purification-chambers suspended from the furnace-roof and entirely supported thereby and means for delivering the gas from the preheater to the purification-chambers.

7. A furnace for purifying gas having a preheater adapted to be heated by the furnace-gases, purification-chambers having removable top and bottom plates suspended from the furnace-roof and entirely supported thereby and means for delivering the gas from the preheater to the purification-chambers.

8. A furnace for purifying gas having a U-shaped preheater enclosed in a refractory material adapted to be heated by the furnace gases, purification-chambers suspended from the furnace-roof and entirely supported thereby and means for delivering gas from the preheater to the purification-chambers.

9. A furnace for purifying gas having a preheater enclosed in the bridge-wall adapted to be heated by the furnace-gases, longitudinally-extended purification-chambers protruding and suspended from the furnace-roof and entirely supported thereby and means for delivering gas from the preheater to the purification-chambers.

10. A furnace for purifying gas having a U-shaped preheater enclosed in the bridge-wall adapted to be heated by the furnace gases, purification-chambers suspended from the furnace-roof and entirely supported thereby and means for delivering gas from the preheater to the purification-chambers.

11. A furnace for purifying gas having a preheater enclosed in a refractory material adapted to be heated by the furnace gases, purification-chambers suspended from and entirely supported by the furnace roof so as to allow for the expansion of said purification-chambers without inducing stresses in the furnace roof and means for delivering the gas from the preheater to the purification-chambers.

12. In a furnace for purifying gas, said furnace being provided with a furnace roof, purification-chambers suspended from and entirely supported by the furnace roof so as to allow for the expansion of said purification-chambers without inducing stresses in the furnace roof.

13. In a furnace for purifying gas, said furnace being provided with a furnace roof, flanged purification-chambers suspended from and entirely supported by the furnace roof so as to allow for the expansion of said purification-chambers without inducing stresses in the furnace roof.

14. In a furnace for purifying gas, said furnace being provided with a furnace roof, purification-chambers having removable top and bottom plates suspended from and entirely supported by the furnace roof so as to allow for the expansion of said purification-chambers without inducing stresses in the furnace roof.

In testimony whereof we hereunto affix our signatures.

HOWARD TOLAN GRAFTON.
CARL WM. WEESNER.
FLOYD JACOB HOFFMAN.